US009564669B2

United States Patent
Zhu et al.

(10) Patent No.: US 9,564,669 B2
(45) Date of Patent: Feb. 7, 2017

(54) MERGED BATTERY CELL WITH INTERLEAVED ELECTRODES

(71) Applicant: Amperex Technology Limited, Tsuen Wan N.T. (HK)

(72) Inventors: Li-Yan Zhu, San Jose, CA (US); Jei-Wei Chang, Cupertino, CA (US)

(73) Assignee: Amperex Technology Limited, Hong Kong (CN)

( * ) Notice: Subject to any disclaimer, the term of this patent is extended or adjusted under 35 U.S.C. 154(b) by 0 days.

(21) Appl. No.: 14/986,629

(22) Filed: Jan. 1, 2016

(65) Prior Publication Data

US 2016/0118698 A1 Apr. 28, 2016

Related U.S. Application Data

(62) Division of application No. 13/406,986, filed on Feb. 28, 2012, now Pat. No. 9,231,271.

(51) Int. Cl.
*H01M 10/654* (2014.01)
*H01M 10/0525* (2010.01)
(Continued)

(52) U.S. Cl.
CPC .......... *H01M 10/654* (2015.04); *H01G 11/12* (2013.01); *H01G 11/18* (2013.01); *H01G 11/72* (2013.01);
(Continued)

(58) Field of Classification Search
CPC .............. H01M 10/654; H01M 10/613; H01M 10/0525; H01M 10/0585; H01M 10/0587; H01M 4/131; H01M 4/133; Y02E 60/122; Y02E 60/13; Y02T 29/4911; Y02T 29/49108; Y02T 29/49115
See application file for complete search history.

(56) References Cited

U.S. PATENT DOCUMENTS 5,204,194 A   4/1993 Miller et al.
6,087,036 A   7/2000 Rouillard et al.
(Continued)

FOREIGN PATENT DOCUMENTS

DE   4104400   9/1991
EP   1014465   6/2000

OTHER PUBLICATIONS

"Thermal Shutdown Characteristics of Insulating Materials Used in Lithium Ion Batteries," by B. N. Pinnangudi et al., Oct. 2010 IEEE, 5 pgs., 978-1-4244-7497-4/10.
(Continued)

*Primary Examiner* — Patrick Ryan
*Assistant Examiner* — Aaron Greso
(74) *Attorney, Agent, or Firm* — Saile Ackerman LLC; Stephen B. Ackerman; Billy Knowles (57) ABSTRACT

A battery having the electrodes of multiple battery cell types are interleaved to prevent thermal runaway by cooling a shorted region between electrodes. The electrodes of each of the battery cell types with a first polarity share a pair of the common electrodes having a second polarity. The electrodes of the multiple battery cell types and the multiple common electrodes are interleaved such that if the electrodes of the multiple battery cell types and the adjacent common electrodes of one or more battery cell types short together, the current within the shorted battery cells is sufficiently small to prevent thermal runaway and the electrodes of the adjacent cells of the other battery cell types of the first polarity and the common electrodes of the second polarity not having short circuits provide heat sinking for the heat generated by the short circuit to prevent thermal runaway.

15 Claims, 9 Drawing Sheets

(51) Int. Cl.
*H01M 10/0585* (2010.01)
*H01G 11/12* (2013.01)
*H01G 11/18* (2013.01)
*H01G 11/72* (2013.01)
*H01M 10/613* (2014.01)
*H01M 4/131* (2010.01)
*H01M 4/133* (2010.01)
*H01M 10/0587* (2010.01)

(52) U.S. Cl.
CPC ..... *H01M 10/0525* (2013.01); *H01M 10/0585* (2013.01); *H01M 10/613* (2015.04); *H01M 4/131* (2013.01); *H01M 4/133* (2013.01); *H01M 10/0587* (2013.01); *Y02E 60/122* (2013.01); *Y02E 60/13* (2013.01); *Y10T 29/4911* (2015.01); *Y10T 29/49108* (2015.01); *Y10T 29/49115* (2015.01)

(56) References Cited

U.S. PATENT DOCUMENTS

| | | |
|---|---|---|
| 6,190,426 B1 | 2/2001 | Thibault et al. |
| 7,544,220 B2 | 6/2009 | Zhao et al. |
| 9,231,271 B2 * | 1/2016 | Zhu .................. H01M 10/0525 |
| 2006/0012334 A1 * | 1/2006 | Watson ................ B60L 3/0046 320/112 |
| 2009/0239130 A1 * | 9/2009 | Culver .................. H01M 2/206 429/50 |
| 2009/0263707 A1 | 10/2009 | Buckley et al. |
| 2010/0175245 A1 | 7/2010 | Do et al. |
| 2010/0255359 A1 | 10/2010 | Hirakawa et al. |
| 2011/0003182 A1 | 1/2011 | Zhu |
| 2011/0020678 A1 | 1/2011 | Straubel et al. |
| 2011/0183169 A1 | 7/2011 | Bhardwaj et al. |

OTHER PUBLICATIONS

"Battery Pack Circuit Design for Safety and Protection," by Mark Dewey et al., Nov. 1995, pp. 543-551, ISBN# 0-7803-2636-9.
"Modeling Studies on Battery Thermal Behavior, Thermal Runaway, Thermal Management, and Energy Efficiency," 96062, by Yufei Chen et al., pp. 1465-1470, Aug. 1996 IEEE, 0-7803-3547-3-7/16.

* cited by examiner

MERGED BATTERY CELL WITH INTERLEAVED ELECTRODES

The present invention is a divisional application that claims priority under 35 U.S.C. §120 from U.S. patent application Ser. No. 13/406,986, filing date Feb. 28, 2012, now U.S. Pat. No. 9,231,271, issued Jan. 5, 2016, incorporated herein by reference in its entirety.

BACKGROUND

Technical Field

This disclosure relates to charge accumulators such as batteries and capacitors, in particular to high capacity multiple cell batteries. More particular this disclosure relates to multiple cell batteries with improved stability to increase capacity of individual cells.

Background

Figure 1A:
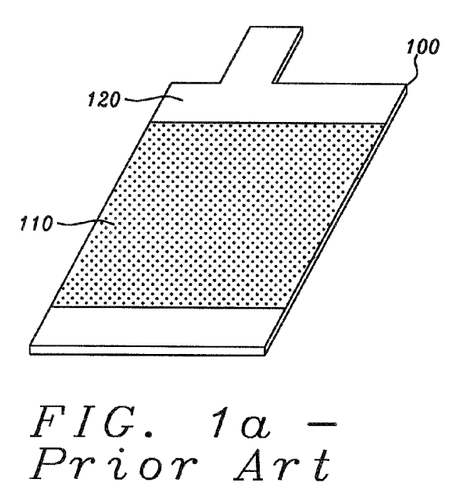
FIGS. 1a-1d illustrates the structure of an anode of a lithium ion battery cell.
Figure 1B:
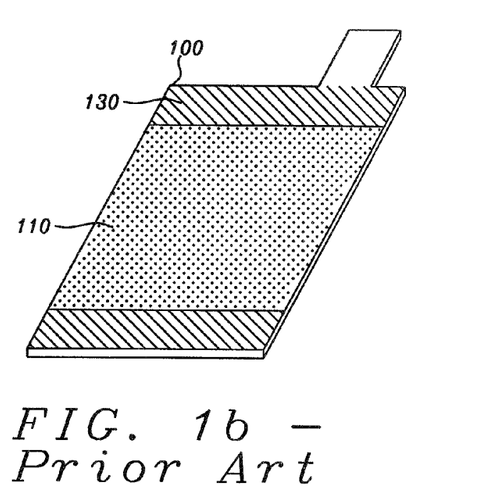
Figures 1C, 1D:
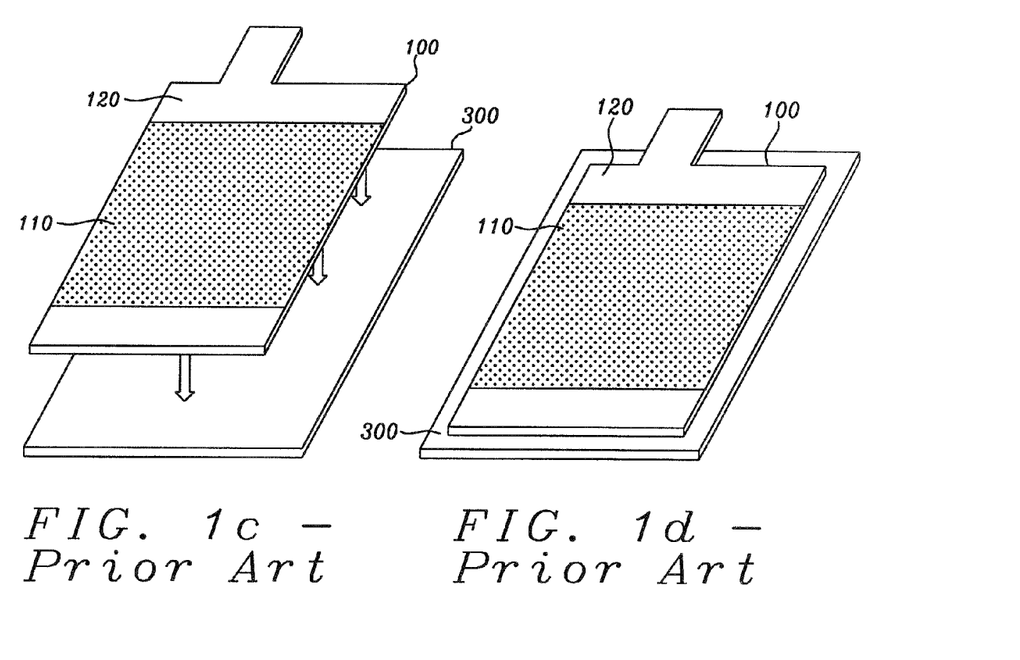
Figure 2A:
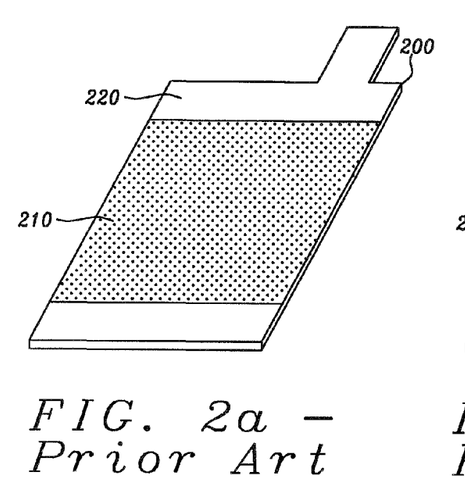
FIGS. 2a-2d illustrates the structure of a cathode of a lithium ion battery cell.
Figure 2B:
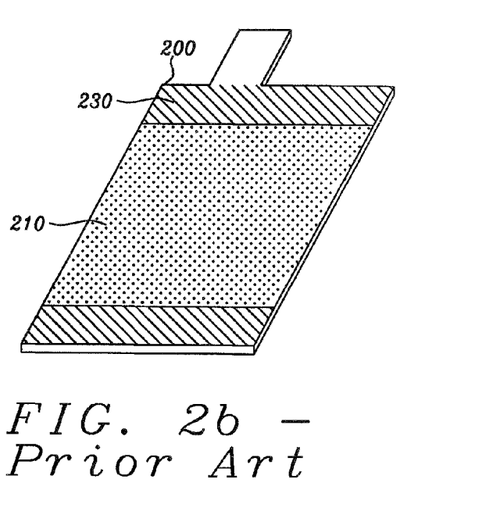
Figures 2C, 2D:
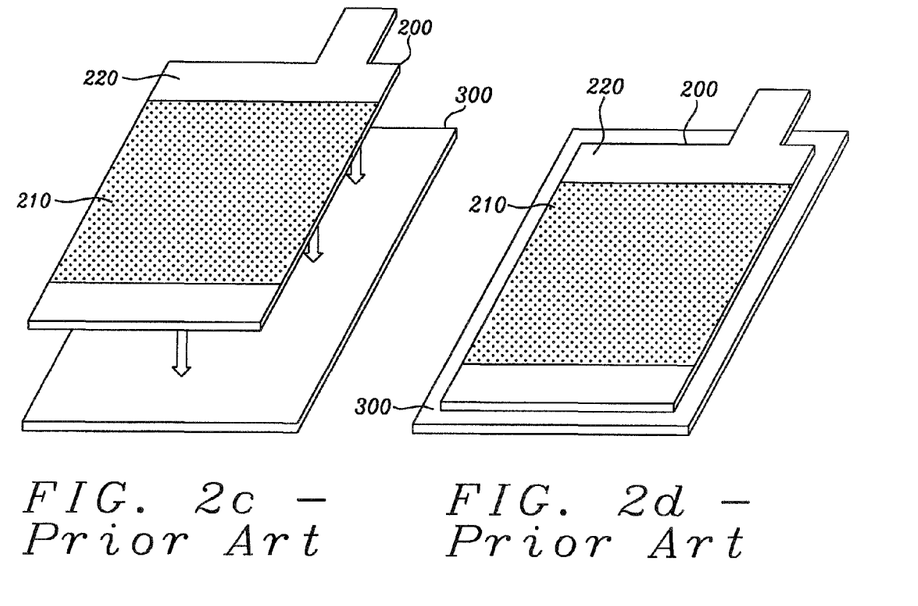
Figure 3:
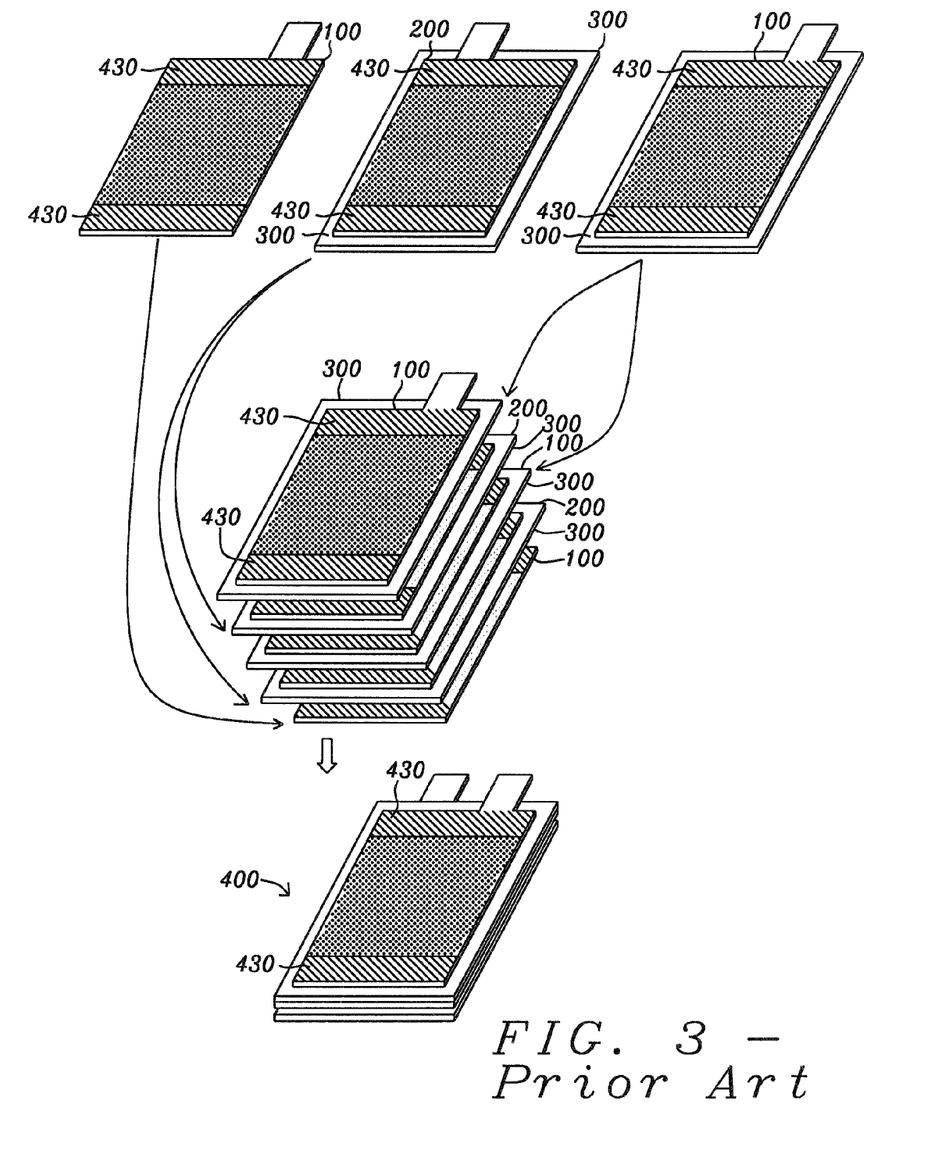
FIG. 3 illustrates the organization of multiple anodes and cathodes to form a lithium ion battery.

U. S. Patent Application Publication 2010/0175245 Do, et al. illustrates an exemplary stacking structure a lithium ion battery. FIGS. 1a-1d illustrates the structure of an anode of a lithium ion battery cell of Do, et al. FIGS. 2a-2d illustrates the structure of a cathode of a lithium ion battery cell of Do, et al. FIG. 3 illustrates the organization of multiple current collectors that are commonly referred to as anodes and cathodes to form a lithium ion battery of Do, et al. In FIGS. 1a-1d, an anode 100 is formed of a metal film 120 such as copper and is coated with an active anode material 110 on both sides of the metal film 120 cut to predetermined dimensions. The active anode material 110 material is typically graphite or carbon that is coated in the form of slurry, and dried. The active anode material 110 does not coat the entire surface area of the metal film 120. An adhesive 130 is placed on an edge portion that is not coated with the active anode material 110 on one side of the anode 100. The adhesive 130 is a material such as glue, starch, an adhesive tape, or other adhesive means. The side of the anode 100 having adhesive material 130 is adhered to a separator 300. The separator 300 is generally a macroporous film of polyethylene or polypropylene.

In FIGS. 2a-2d, a cathode 200 is formed of a metal film 220 such as aluminum and is coated with an active cathode material 210 on both sides of the metal film 220 cut to predetermined dimensions. The active cathode material 210 is typically Lithium cobalt oxide ($LiCoO_2$), Lithium Iron Phosphate ($LiFePO_4$), or other similar reactive material. The active cathode material 210 does not coat the entire surface area of the metal film 220. An adhesive 230 is placed on an edge portion that is not coated with the active cathode material 210 on one side of the anode 200. The adhesive 230 is a material such as glue or starch, an adhesive tape, or other adhesive means. The side of the cathode 200 having adhesive material 230 is adhered to a separator 300.

In FIG. 3, the anodes 100 attached to a separator 300, the cathodes 200 attached to a separator 300, an unattached anode 100 have an adhesive placed at the remaining edge portion not coated with the active anode material 110 or active cathode material 210. The unattached anode 100 is placed at a bottom of the stack and the cathodes 200 attached to the separators 300 are stacked alternately with the anodes 100 attached to the separators 300 in an interleaved fashion. The stack is then compressed to adhere the adhesives to an opposite side of the separator 300 placed above the electrode (anode 100 or cathode 200). The compressed stack 400 is then placed in a shell (not shown) and an electrolyte solution is placed in the shell to immerse the anodes 100 and the cathodes 200. The electrolyte solution is a mixture of a solute (as ion source) dissolved in organic solvent. In lithium ion batteries, propylene carbonate or ethylene carbonate may be used as the organic solvent and lithium phosphate as the solute.

In some implementations, each electrode (anode 100 and cathodes 200) is a sheet of electrically conductive current collector, such as copper film in the anodes 100, and aluminum film in the cathodes 200. Except for the top and bottom sheets in the stack, each electrode 100, 200 is coated on both sides with electrochemically active material, such as graphite in the anodes 100 and lithium metal oxide in the cathodes 200. The top and bottom surfaces of the stack do not require coating, because these two surfaces are not facing electrodes 100, 200 of opposite polarity and do not participate in the electrochemical reaction.

Internal shorts between the electrodes 100 and 200 of a cell of a battery may be caused by burrs on the current collector (the aluminum or copper foil on which the electrochemically active material is coated). In particular, aluminum burrs may penetrate the separator and contact the graphite to cause thermal runaway. The contact resistance closely matches the internal resistance (output resistance) of a lithium-ion cell for portable electronics.

Another cause of the internal shorts is mossy lithium dendritic growth on the anode surface may penetrate the separator. Since the dendrite will contact lithium metal oxide cathode coating, which is not very conductive, the hazard of thermal runaway is lower than aluminum burrs. It takes a very large mossy lithium dendrite to initiate thermal runaway.

Foreign particles such as conductive metal chips present in incoming material (for example steel wear debris in the cathode powders, or falling burrs from the steel cans), or entering the cell during assembly process (for example wear debris in the conveyer) may migrate into the cathode/anode interface. Also, metal particles formed during charging/discharging cycles by galvanic process and can thus breach the separator to cause shorts.

External forces such as bending and impact on the cell may cause electrodes to break. Exposed current collectors (Cu or Al foils) may penetrate the separator to cause shorts.

Manufacturing defect such as a defective separator or folding separator during the stacking/winding (assembly) process may leave the positive and negative electrodes in contact over the defect zone.

Usually, internal short involves only one interface. In a conventional cell, all positive/negative electrode interfaces are hard wired together. Thus the short draws current from all interfaces. In the present disclosure, the interfaces are partitioned into two groups that may be separated completely or through a buffer resistor. Thus only half of the interfaces are contributing to the short current. Considering that the heat generated at the short spot is proportional to the square of current, this disclosure effectively cuts down the hot spot heat generation by a factor of four.

When an inadvertent electrical short circuit occurs within a cell, the resistance of the short circuit connection causes overheating in the electrode and the separator. The temperature at the short circuit region may be sufficiently high to trigger thermal runaway that will lead to fire and explosion. For any given cell, the short circuit connection generates maximum amount of heat when its resistance equals the cell's output resistance. However at any given short circuit, heat generation increases monotonically with decreasing output resistance of the cell. Since the output resistance is approximately inversely proportional to the cell capacity, heat generation at any given short increases monotonically with the cell capacity.

The electrical short circuiting of the electrodes is often referred to as a "dead short", i.e., bare metal contacts with negligible resistance. In this case, the short circuit current is proportional to the cell capacity. By Joule's law, heat generation at the short is proportional to the short circuit current squared, hence the square of cell capacity. A dead short circuit in a high capacity cell or battery can generate enough heat to induce thermal runaway around the short circuit location within the electrodes, even if the short circuit is very brief (e.g., the contact may burn out or melt down). Thus the threshold of cell capacity must be observed very strictly.

Thermal runaway occurs when heat released in a short circuit region through exothermal chemical reaction exceeds heat dissipation capability from the short circuit region. Thus cooling is an effective way for the prevention of the exothermic reaction to cause the thermal runaway. Experience has shown that thermal runaway occurs much more readily at elevated temperature than at room temperature. Furthermore, cooling by conduction is known to reduce the occurrence of thermal runaway. For example, a short at the corner of an electrode is more likely to cause thermal runaway than a short at the center of the electrode. This is because a short circuit at a corner is connected to electrodes in only one quadrant, where as a short at the center is surrounded by electrodes in all four quadrants. A short at the center has four times as much heat sink as a short at a corner.

A larger cell does not necessarily serve as a better heat sink to a short, because the thermal runaway may begin rapidly in a small region, especially during a dead short. There is no significant heat dissipation outward. Thus it does not matter how large the cell is, as far as heat sink is concerned. Cell output resistance remains as the dominant factor in the initiation of thermal runaway. Unfortunately, the battery output resistance is getting lower and lower to meet the power requirement of modern portable electronics.

In order to prevent thermal runaway, a common practice is to partition the battery into a plurality of low capacity battery cell types. Presently two or three cells are connected in parallel in popular tablet computers such as Apple iPad™. Merging two battery cell types into one may result in 12% to 19% increase in capacity, and 15% cost reduction. However such cost reduction and capacity gain cannot be realized, lest the capacity of such merged cell may exceed the safety threshold. There is an acute need to raise the safety threshold.

Modest cost reduction can also be achieved by encasing multiple cells into a single shell. Amperex Technology Limited (ATL), Tsuen Wan, N. T., Hong Kong (Assignee of the present disclosure) has been shipping such shell-sharing cells since 2008. For example, each 20Ah battery cell consists of a single stainless steel case, with two shell-less cells (commonly known as "jellyrolls") stacked together, and connected internally in parallel. U.S. patent application Ser. No. 12/694,144 (Ramesh et al.) provides a battery pouch holding multiple jellyrolls side-by-side. The multiple jellyrolls are connected outside of the pouch. Heat transfer between multiple jellyrolls is ineffective in ATL's stacking arrangement, and negligible in Ramesh's side-by-side layout.

SUMMARY

An object of this disclosure is to provide a battery having the electrodes of multiple battery cell types interleaved to prevent thermal runaway.

Another object of this disclosure is to provide a battery having multiple merged battery cell types structured to prevent thermal runaway by cooling a shorted region within between electrodes.

To accomplish at least one of these objects, a battery includes multiple electrodes of any number of battery cell types of a first polarity. The electrodes of each of the battery cell types share a pair of the common electrodes having a second polarity. The electrodes of the multiple battery cell types and the multiple common electrodes are interleaved such that the stack effectively includes multiple electrically independent cells. These multiple electrically independent cells are merged into a single stack, and will share a common shell or pouch. The merged cells may be connected either externally (i.e., outside of the shell) or internally (i.e., within the shell) in parallel. However external connection is generally preferred for two reasons. First, each of the two merged cells may be tested independently during manufacturing and secondly, the external connection provides flexibility in the selection of an inrush current limiter (e.g., a buffer resistor, a re-settable fuse, or a positive thermal coefficient element). Further, this provides convenience in service. A typical internal short involves only one of the multiple merged cells. With a suitable inrush current limiter, if the electrodes of the multiple battery cell types and the adjacent common electrodes of one or more battery cell types short together, the current within the shorted battery cells is sufficiently small to prevent thermal runaway and the electrodes of the adjacent battery cells of the other battery cell types of the first polarity and the common electrodes of the second polarity not having short circuits provide heat sinking for the heat generated by the short circuit to further prevent thermal runaway.

In some embodiments, the common electrodes are coupled to first connective tabs at a first common location at one edge of the electrodes and the electrodes of the first polarity are coupled to connective tabs common at locations such that each battery cell of the plurality of battery cell types has a unique connective tab location for the electrodes of the first polarity that is separate from the connective tab locations of the connective tab locations of the all other battery cell types.

In other embodiments, the electrodes of the first polarity for one battery cell type are coupled to multiple connective tabs and the multiple connective tabs are located such that at least a second battery cell type is created by rotating the surfaces of the one battery cell type to shift the location of the multiple connective tabs.

In still other embodiments, the common electrodes are coupled to connective tabs on one edge of the common electrodes and the electrodes of the first polarity of at least one battery cell type are coupled to connective tabs at an opposing edge. The connective tabs located such that at least a second battery cell type is created by rotating the surfaces of the electrodes of the first polarity of the first battery cell type.

In various embodiments, the interleaved electrodes of the first polarity of each battery cell type and the common electrodes are placed in a shell or pouch. An electrolyte is placed in the shell or pouch to immerse the battery cells. The shell or pouch is sealed with the connective tabs for the electrode of the first polarity of each battery cell type connected to a terminal for the first polarity and the connective tabs for the common electrodes connected to a common terminal.

In some embodiments, the electrodes of the first polarity have a differing chemistry between the battery cell types.

In various embodiments, the merged battery cell types are connected in a series configuration. In other embodiments, the merged battery cell types are connected in a parallel configuration. In still other embodiments, the merged battery cell types are connected in a series-parallel configuration. In various embodiments, the merged battery cell types are protected by a current limiting device such as a fuse, a thermal cut-off device, a positive thermal coefficient device, a metal-oxide-semiconductor field effect transistor (MOSFET), or other device or circuitry capable of restricting the excess current flow through the battery cells in an overcurrent event.

In various embodiments, at least one of the objects is accomplished with a method for forming a battery having multiple merged battery cell types structured to prevent thermal runaway by cooling a shorted region within between electrodes. A plurality of battery cell types is formed with each battery cell type having multiple electrodes of a first polarity. Each electrode of each of the plurality of battery cell types is formed with a connection tab placed at a unique location. Multiple common electrodes of a second polarity are formed with each electrode having a connection tab placed at another unique location.

The electrodes of each of the plurality of battery cell types and common electrodes are formed of a metal film adhered to a separator. The metal film, in some embodiments, is aluminum and in other embodiments, is copper. The metal film in the interior of the battery is coated on both sides with an electrochemically active material. The metal film situated at each end of the electrode stack has the electrochemically active material placed on one surface facing toward the interior of the battery. In some embodiments, the electrochemically active material of the anode is graphite and the electrochemically active material of the cathode is lithium metal oxide.

The electrodes of each of the plurality of battery cell types are interleaved with a common electrode placed between each of the electrodes of each of the plurality of battery cell types. The connection tabs of the electrodes of each of the plurality of battery cell types are connected together. The connection tabs of each of the common electrodes are connected together. The interleaved stack of the electrodes is then compressed and placed in a containment shell. The containment shell may be a metal shell such as stainless steel or a non-reactive plastic. In other embodiments, the interleaved stack of electrodes is placed in a plastic pouch that is sealed. The containment shell or the pouch is filled with an electrolyte to immerse the electrodes.

DETAILED DESCRIPTION

A high capacity battery often consists of a multiple of low capacity battery cells connected in parallel. There is a strong desire to minimize the number of cells, for cost reduction, ease of assembly, and packing efficiency improvement. However this will require an increase in the capacity of individual cells. Unfortunately, the capacity of individual cells is limited by stability of the cell. This is true for all types of charge accumulators (battery cells and capacitors), but especially serious for lithium ion battery cells.

A battery, the cell structure of a battery and a method of assembly of battery cells that embody the principles of this disclosure effectively prevents thermal runaway by limiting a short circuit current, and by providing a heat sinking capacity for cooling the location of the short circuit. This is accomplished by merging at least two different battery cell types in a stack, sharing electrodes of one polarity and interleaving electrodes of another polarity. A stack of battery cell types includes common electrodes of one type and may be either positive or negative electrodes. In some embodiments the common electrodes are positive electrodes and the stack further includes multiple types of negative electrodes. The common electrodes have connective tabs located in one location and the each of the multiple types of electrodes have connective electrodes have connective tabs located in unique locations for each of the types of electrodes separated from the connective tabs of the others of the multiple types of electrodes and the common electrodes.

In some embodiments, some electrodes may have more than one connective tab to achieve low electrical resistance, and more uniform current distribution. On the other hand, due to limited space, and for the ease of production, the number of tabs should be minimized. Furthermore, it is sometimes desirable to have the aluminum tab of the cathode acting as a fuse. In this case a cathode is likely to have one tab only. Regardless of the number of tabs in each type of electrode, tabs of different types of electrodes should be situated such that they do not interfere with each other. In various embodiments, the connective tabs are located such that one of the types of electrodes are formed from another type of electrode of the same polarity by a mere rotation. Since electrodes on both ends of the stack need to be symmetrical to and congruent with each other, it follows that they are preferably of the common type, and that tabs of the common type should be symmetrically located.

In some embodiments, the connective tabs of the common electrodes are located at one edge of the common electrodes and the connective tabs of the multiple types of electrodes are formed at locations on other edges of the multiple electrodes. In various embodiments, the connective tabs are formed at the edge opposite of the connective tabs of the common electrodes such that the terminal of the common electrodes is at one end of the battery and the terminals of the multiple electrodes is at an opposing end of the battery.

Figures 4A, 4B, 4C:
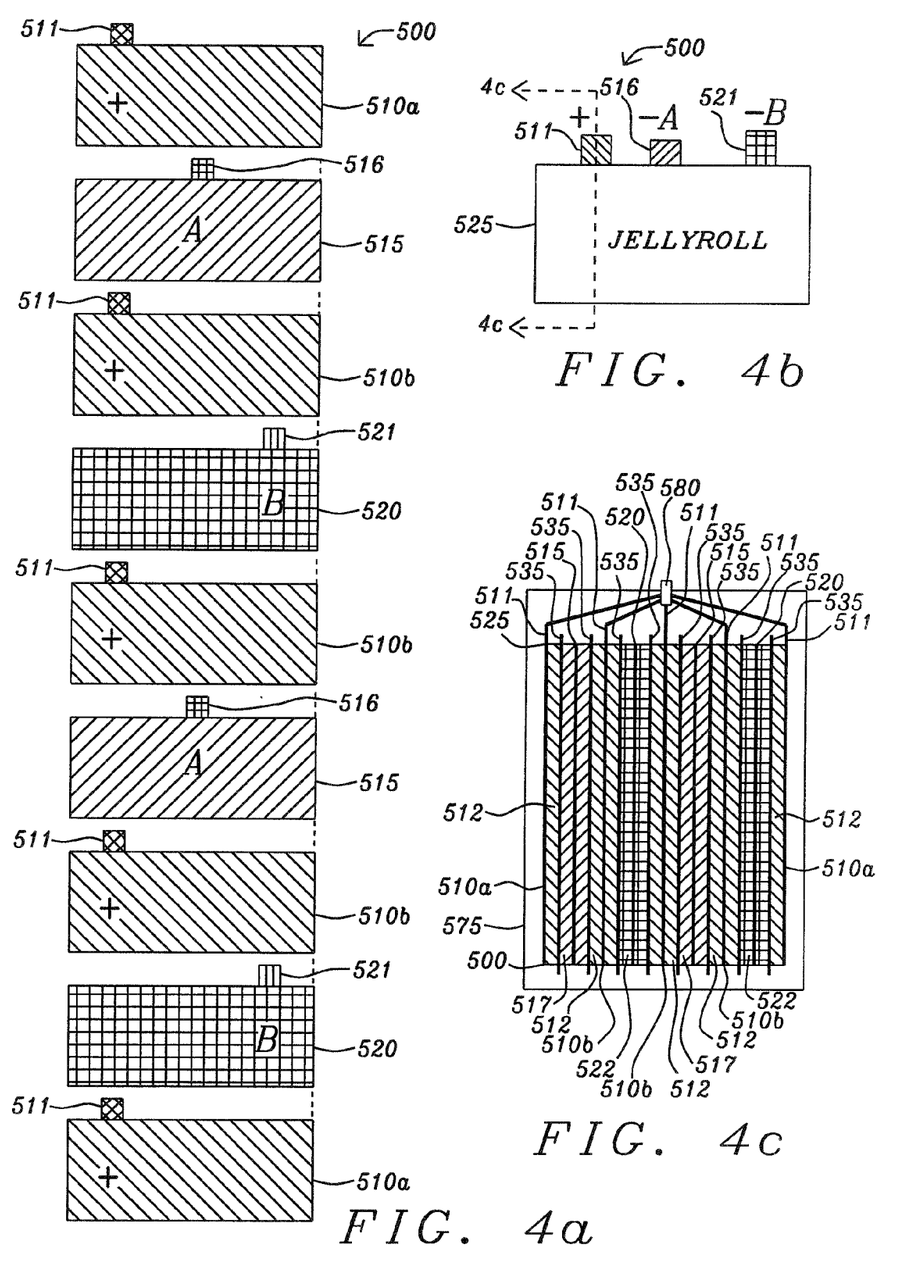
FIGS. 4a-4c illustrate the anodes and cathode of multiple interleaved battery cell types embodying the principles of the present disclosure.

FIGS. 4a-4c illustrate the anodes and cathodes of multiple interleaved battery cell types 500 embodying the principles of the present disclosure. In FIG. 4a, the common electrodes 510a and 510b are formed of the metal film such as copper. The copper film is fully coated with an electrochemically active material such as graphite except for the tabs 511 that remain exposed. The exterior electrodes 510a that are present at the ends of the stack of electrodes 500 are coated with the electrochemically active material on the one side facing the interior of the stack 500 of the electrodes, again with the exception of the tabs, 511 that remain exposed. The exterior surfaces of the electrodes 510a do not require coating, because these two surfaces are not facing electrodes 516 and 520 of opposite polarity and do not participate in the electrochemical reaction. The electrodes 510b within the interior of the stack 500 of electrodes are coated on two sides of each of the common electrodes 510b. Each of the common electrodes 510a and 510b have the connective tab 511 placed at a unique location aligned to facilitate connecting the connective tabs together and to an external terminal (not shown).

Each of the interior common electrodes 510b is placed adjacent to one of the electrodes 515 520 of the multiple battery cell types (type A and type B in the present embodiment) and separated by a separator 535 of FIG. 4c. The separator 535 is generally a macroporous film such as polyethylene or polypropylene, as described above. The battery cell type A electrodes 515 and battery cell type B electrodes 520 are formed of the metal film such as aluminum. The aluminum film is coated with an electrochemically active material such as lithium metal oxide (lithium cobalt oxide and lithium magnesium aluminum oxide) except for the tabs 516 and 521 that remain exposed. Each of the battery cell type A electrodes 515 has the connective tab 516 placed at a unique location aligned to facilitate connecting the connective tabs 516 together and to an external terminal (not shown). Similarly, each of the battery cell type B electrodes 520 has the connective tab 521 placed at a unique location aligned to facilitate connecting the connective tabs 521 together and to an external terminal (not shown).

The stack 500 of the common electrodes 510a and 510b, the battery cell type A electrodes 515, and battery cell type B electrodes 520 are aligned and compressed as shown in FIGS. 4b and 4c. The stack 500 forms a compact unit that is commonly referred to as a "jellyroll". The jellyroll stack 500 is placed in a metal container 525 or a pouch and an electrolyte is placed in the container 525 and the container 525 is sealed. The connective tabs 511, 516, and 521 extend beyond the container 525. The connective tabs 511, 516, and 521 that are congruent at the same location on the edges of the common electrodes 510a and 510b, the battery cell type A electrodes 515, and battery cell type B electrodes 520 are connected together (e.g., through welding, soldering, crimping, bolt, screw, etc.). Then the stack 500 has three terminals and can be considered as a battery of two merged battery cell types. Both battery cell type A and battery cell type B share a positive terminal and the battery cell type A and battery cell type B has its own separate negative terminal.

FIG. 4c is a cross section of the jellyroll 525 of FIG. 4b as cut through the common terminal 511 of FIG. 4b and placed within a shell 575 to form a battery. The jellyroll 525 has the common electrodes 510a and 510b each coated with the electrochemically active material 512 as described above. Adjacent to each of the common electrodes 510a and 510b are the interleaved battery cell type A electrodes 515 and the battery cell type B electrodes 520. The battery cell type A electrodes 515 and the battery cell type B electrodes 520 are each respectively coated with the electrochemically active material 517 and 522. Between each of the coated electrodes 510a, 510b, 515 and 520 is the separator 535. The separators 535 are each extended beyond the edges of the coated electrodes 510a, 510b, 515 and 520 that extends beyond the electrodes. The separators 535 may also wrap around the stack of electrodes. Each of the tabs 511 of the common electrodes 510a and 510b are connected to an aluminum adaptor 575 that feed through the sealing of the battery shell 575.

It should be noted that the embodiment as shown in FIGS. 4a-4c, that the common electrodes 510a and 510b may be cathodes rather than anodes and still be in keeping with the principles of the present disclosure. Similarly, the battery cell type A electrodes 515 and the battery cell type B electrodes 520 may be anodes rather than cathodes and still be in keeping with the principles of the present disclosure. Any type of electrode (battery cell type A electrodes 515, battery cell type B electrodes 520, or the common type 510a and 510b) may be placed at both ends of the stack. The stacking sequence of electrodes 510a, 510b, 515 and 520 consists of a repetition of a preselected "building block". For example, a stack order of "A, C, B, C", "B, C, A, C", "C, A, C, 2", and "C, B, C, A" are all valid repeating blocks. A stack consists of an integer number of whole blocks, with an exception that the first electrode on the top of the stack is "split into two halves", and that one of the halves is moved to the bottom of the stack. For example, a stack of electrodes of the order "A, C, B, C, A, C, B, C" consists of two repeating electrode blocks "A, C, B, C". To form a valid electrode stack, the first electrode "A" must be replaced by two one-sided Type A electrodes. So a valid stack configuration is "A, C, B, C, A, C, B, C, A", as shown in FIGS. 4a and 4c.

An electrode stack of a first number (M) of merged cells 510a, 510b, 515 and 520 consists of a second number (T) of types of electrodes (515 and 520 in the example of FIGS. 4a-4c) of one polarity, and one type common electrode (510a and 510b) of a second polarity. The basic building block consists of 2T electrodes 510a, 510b, 515 and 520 each coated on both sides. The block may be repeated by a third number (k) times, where k is any positive integer, to yield desired capacity. The repetition yields 2kT double-sided electrodes. However the top and bottom ends accommodate one-sided electrode only. Thus one of the 2kT double-sided electrodes should be replaced by two single-sided electrodes. In summary, a stack consists of 2kT+1 electrodes, of which all but two are double-sided.

It is known by one skilled in the art that there are other methods of stacking the electrodes 510a, 510b, 515 and 520. The method of stack construction described is exemplary and the it would be obvious to one skilled in the art to incorporate the merging of multiple battery cell types of the present disclosure into the other methods of stacking to be in keeping with the principles of the present disclosure.

Figure 5A:
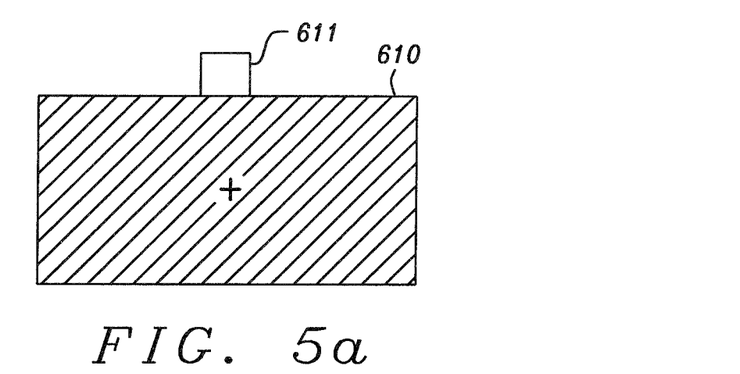
FIGS. 5a-5c illustrate the organization of the connective tabs of the anodes and cathodes of multiple interleaved battery cell types embodying the principles of the present disclosure.
Figure 5B:
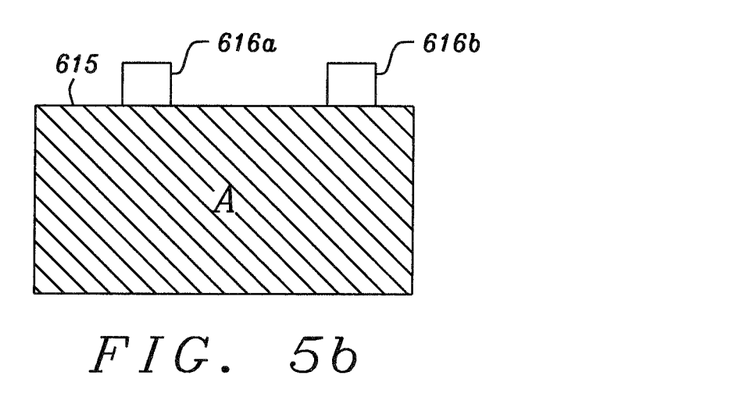
Figure 5C:
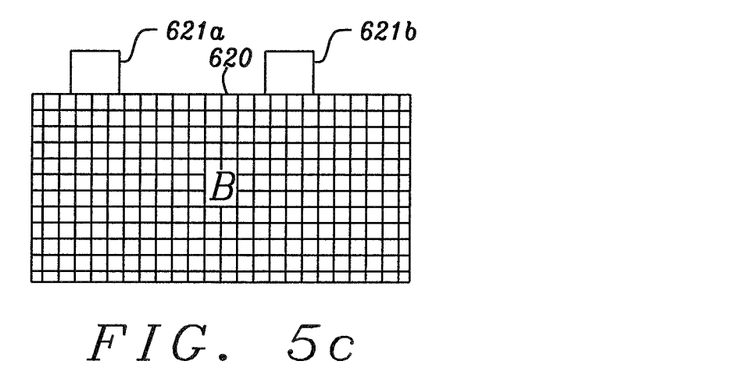

FIGS. 5a-5c illustrate the organization of the connective tabs 611, 616a, 616b, 621a, 621b, of the common electrodes 610, the battery cell type A electrodes 615, and battery cell type B electrodes 620 of multiple interleaved battery cell types embodying the principles of the present disclosure. In FIGS. 4a-4c, the common electrodes 510a and 510b, the battery cell type A electrodes 515, and battery cell type B electrodes 520 each have single connective tabs 511, 516, and 521. Referring to FIGS. 5a-5c, in order to prevent crowding in the vicinity of the connective tabs 511, 516, and 521 of FIGS. 4a-4c, multiple tabs 616a, 616b, 621a, 621b are located at an edge of the electrodes 615 and 620. To facilitate manufacturing, the tabs 616a and 616b are located on the electrode 615 symmetrically such that the electrode 615 is rotated horizontally to become the electrode 620. The connective tabs 621a and 621b are now located at unique locations on the edge of the electrode 620 from the tabs 616a and 616b of the electrode 615

Figure 6:
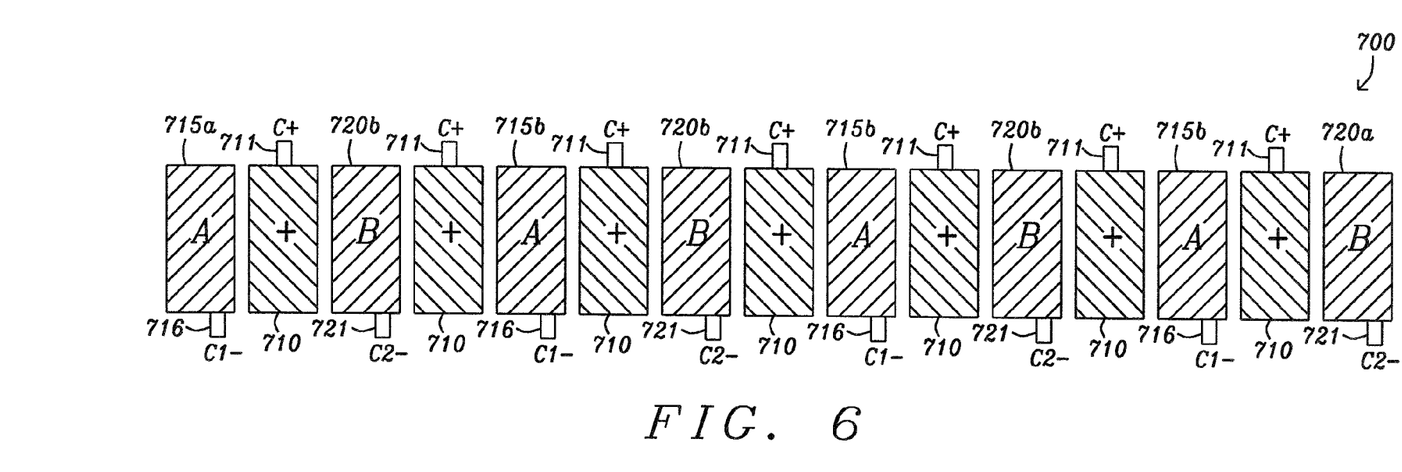
FIG. 6 illustrates a structure of an embodiment of the anodes and cathodes of multiple battery cell types embodying the principles of this disclosure.
Figure 7:
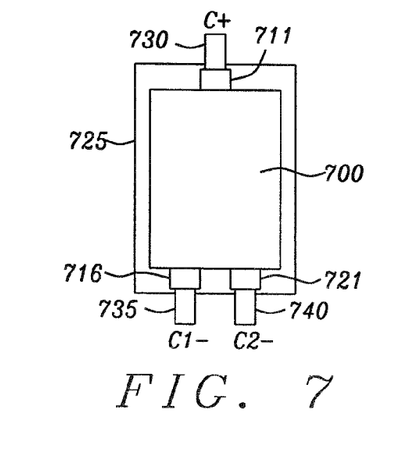
FIG. 7 illustrates the stacking, compressing, and packaging in a shell or pouch the multiple battery cell types of FIG. 6 embodying the principles of this disclosure.

FIG. 6 illustrates a structure of an embodiment of the electrode of multiple battery cell types embodying the principles of this disclosure. FIG. 7 illustrates the stacking, compressing, and packaging in a shell or pouch the multiple battery cell types of FIG. 6 embodying the principles of this disclosure. In FIG. 6, the common electrodes 710 are formed of the metal film such as copper placed in close proximity to a separator. The copper film is coated with an electrochemically active material such as graphite. The common electrodes 710 within the interior of the stack 700 of electrodes are coated on two sides with the electrochemically active material. Each of the common electrodes 710 have a connective tab 711 placed at a unique location at a first edge of the common electrodes 710 and are aligned to facilitate connecting the connective tabs together and to an external terminal (not shown).

Each of the common electrodes 710 is placed adjacent to one of the electrodes 715a, 715b, 720a, and 720b of the multiple battery cell types (type A and type B in the present embodiment). The battery cell type A electrodes 715a and 715b and battery cell type B electrodes 720a, and 720b are formed of a metal film such as aluminum in close proximity with a separator. The aluminum film is coated with an electrochemically active material such as lithium metal oxide (lithium cobalt oxide and lithium magnesium aluminum oxide). Each of the battery cell type A electrodes 715a and 715b have a connective tab 716 placed at a unique location aligned at a second edge opposite the first edge of the common electrodes 710 to facilitate connecting the connective tabs 716 together and to an external terminal (not shown). Similarly, each of the battery cell type B electrodes 720a, and 720b have a connective tab 721 placed at a unique location at the second edge opposite the first edge of the common electrodes 710 and aligned to facilitate connecting the connective tabs 721 together and to an external terminal (not shown). The battery cell type A electrode 715a and the battery cell type B electrode 720b are placed at the exterior ends of the stack of electrodes 700 are coated with the electrochemically active material on the one side facing the interior of the stack 700 of the electrodes. The exterior surfaces of the battery cell type A electrode 715a and the battery cell type B electrode 720b do not require coating, because these two surfaces are not facing electrodes 710 of opposite polarity and do not participate in the electrochemical reaction. The battery cell type A electrode 715b and the battery cell type B electrode 720a within the interior of the stack 700 of electrodes are coated on two sides of each of the common electrodes 710b.

In some embodiments, the connective tabs 716 of the battery cell type A electrodes 715a and 715b and the connective tabs 721 of the battery cell type B electrodes 720a, and 720b are placed in mirroring locations. The battery cell type A electrodes 715a and 715b and the battery cell type B electrodes 720a, and 720b are commonly manufactured with the battery cell type B electrodes 720a, and 720b being the battery cell type A electrodes 715a and 715b rotated horizontally in the illustration. This permits the two connective tabs 716 and 721 to be sufficiently separated to have two separate cell connection. In FIG. 7, the interleaved stack 700 of the common electrodes 710, battery cell type A electrodes 715a and 715b, and battery cell type B electrodes 720a, and 720b are placed in close proximity to a separator placed between each of the electrodes of the interleaved stack 700. The interleaved stack 700 is compressed and placed in the container shell or pouch 725. The container shell or pouch 725 is filled with an electrolyte and sealed. The connective tabs 711, 716, and 721 are respectively connected to the terminals 730, 735, and 740. The terminals 730, 735, and 740 allow the merged cell battery to be connected in series, parallel, or a hard series/soft parallel configuration.

Figure 8:
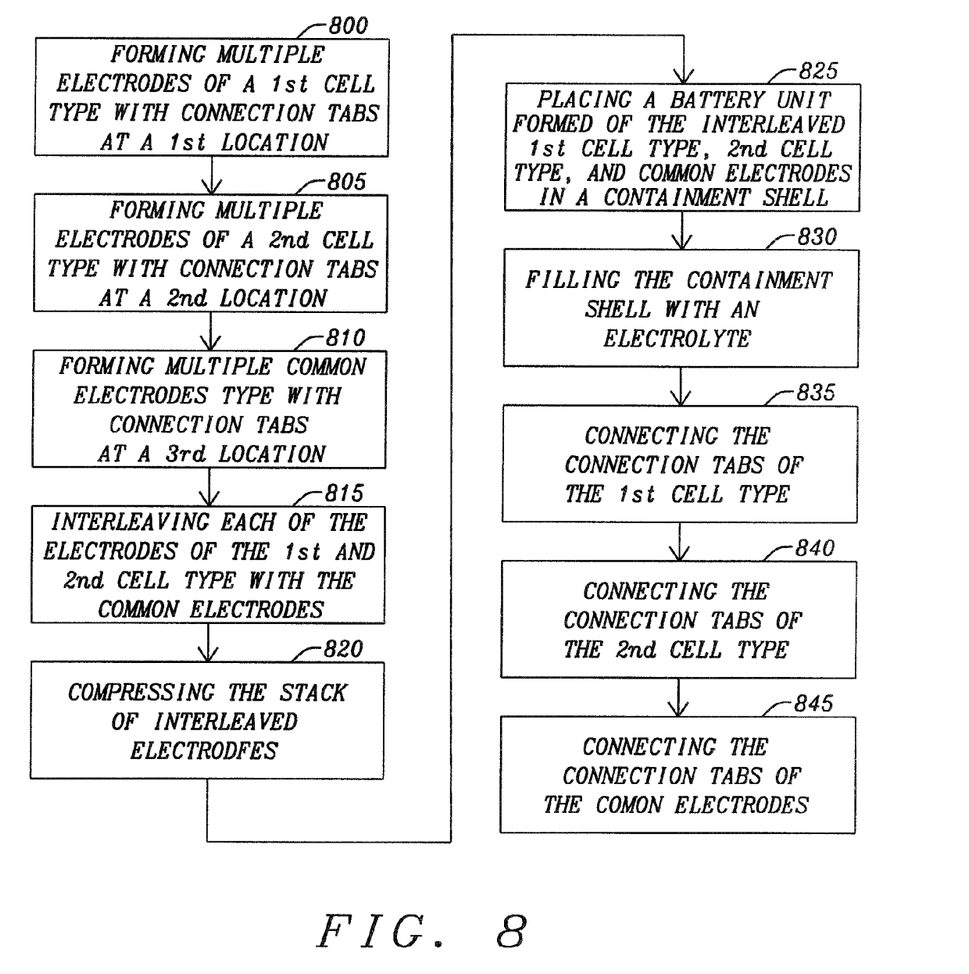
FIG. 8 is a flow chart for a method of forming a multiple cell battery with interleaved electrodes embodying the principles of this disclosure.

FIG. 8 is a flow chart for a method of forming a multiple cell battery with interleaved electrodes embodying the principles of this disclosure. The method for forming a battery having multiple merged battery cell types is structured to prevent thermal runaway by cooling a shorted region within between electrodes. The method begins with forming (Box 800) multiple electrodes of a first polarity of a first battery cell type (cathode). Each electrode of the first battery cell type is formed with a connection tab placed at a first unique location. The method continues with forming (Box 805) multiple electrodes of the first polarity of a second battery cell type (cathode). Each electrode of the second battery cell type is formed with a connection tab placed at a second unique location. Multiple common electrodes of a second polarity (anodes) are formed (Box 810) with each electrode having a connection tab placed at a third unique location.

It should be noted that while the method is illustrating electrodes of two battery cell types of the first polarity, any number of battery cell types of the first polarity may be formed. The connection tabs for each of the electrodes of the multiple battery cell types must be placed to avoid contact between the electrodes of each battery cell type. In various embodiments, the two battery cell types may have a common structure and differ only in horizontal orientation.

The electrodes of each of the first and second battery cell types are formed of a metal film such as aluminum in close proximity with a separator. The common electrodes are formed of a metal film such as copper in close proximity with a separator. The metal film of the first battery cell type, second battery cell type, and common electrodes placed in the interior of the battery is coated on both sides with an electrochemically active material. The electrodes placed at the exterior surface have the electrochemically active material placed on one side of the electrode place toward the interior of the battery. In the embodiments as shown above, the exterior electrodes are the common electrodes. The electrochemically active material for the common electrodes is graphite and the electrochemically active material for the electrodes of the first and second battery cell types is a lithium metal oxide (lithium cobalt oxide or lithium magnesium aluminum oxide).

The electrodes of each of the first and second battery cell types are interleaved (Box 815) with a common electrode placed between each of the electrodes of each of the first and second battery cell types. The stack of the interleaved electrodes is compressed (Box 820) to form a battery unit. The battery unit of the interleaved electrodes is placed (Box 825) in a containment shell or pouch. The containment shell may be a metal shell such as stainless steel or a non-reactive plastic. In other embodiments, the interleaved stack of electrodes is placed in a plastic pouch that is sealed. The containment shell or the pouch is filled with an electrolyte to immerse the electrodes. The connection tabs of the electrodes of the first battery cell type are connected (Box 830) together and the connection tabs of the electrodes of the second battery cell type are connected (Box 835) together. The connection tabs of the common electrodes are connected together (Box 840). The connection tabs of each of the common electrodes are connected together.

Figure 9A:
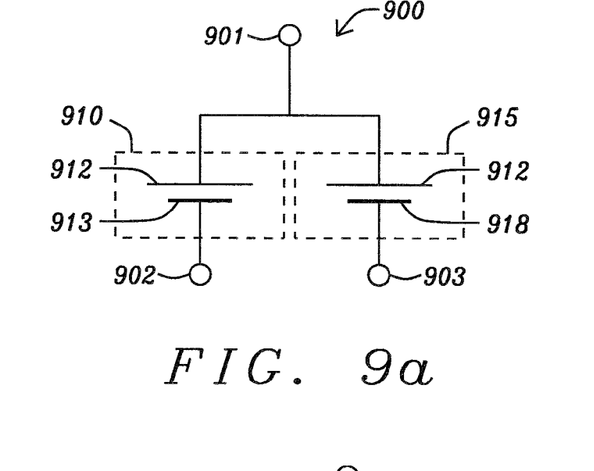
FIGS. 9a-9c are schematics of embodiments of parallel structures of a multiple cell battery with interleaved electrodes embodying the principles of this disclosure.
Figure 9B:
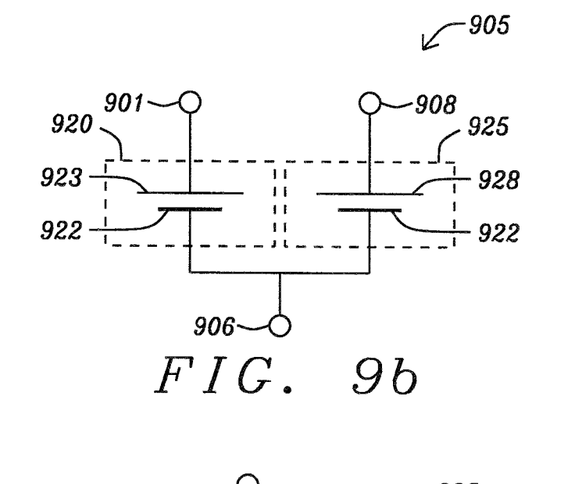
Figure 9C:
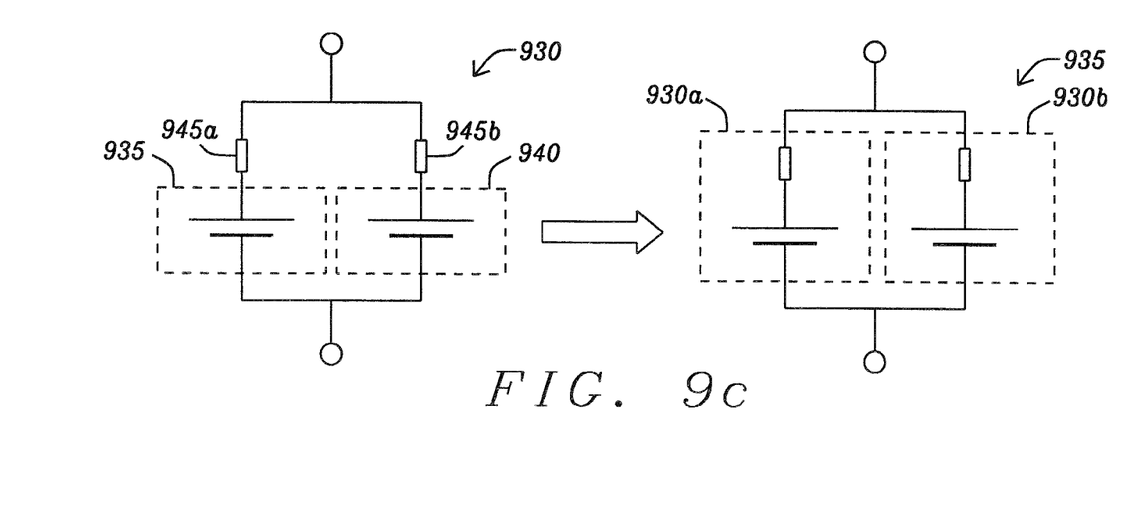

FIGS. 9*a*-9*c* are schematics of embodiments of parallel structures of a multiple cell battery 900 with interleaved electrodes. FIG. 9*a* a battery cell structure 900 with a common anode 912 for each of the battery cell types 910 and 915. There are two types of cathodes 913 and 918. In FIGS. 4*a* and 4*c*, the common anode type 912 would be the anodes 510*a*, 510*b* and the two cathode types 913 and 918 would be the cathode electrode types 515 and 520. The common anode types 912 have the tabs 511 of FIG. 4*a* connected to the terminal 901. The terminal 901 being equivalent to the terminal 580 of FIG. 4*c*. The two cathodes 913 and 918 are connected through the tabs 516 and 522, respectively of FIG. 4*a* to the terminals 902 and 903.

FIG. 9*b* a battery cell structure 905 with a common cathode 922 for each of the battery cell types 920 and 925. There are two types of anode 923 and 918. In FIGS. 4*a* and 4*b*, the common cathode type 912 would be analogous to the anodes 510*a*, 510*b* and the two anode types 923 and 928 would be analogous to the cathode electrode types 515 and 520. The common cathode types 922 are connected to the terminal 906. The two cathodes 923 and 928 are connected to the terminals 907 and 908. Each common cathode 922 electrode of the stack 905 of electrodes is the aluminum film is coated with an electrochemically active material such as lithium metal oxide (lithium cobalt oxide and lithium magnesium aluminum oxide) except for the tabs that remain exposed. The two anodes 923 and 928 that are the copper film is fully coated with an electrochemically active material such as graphite except for the tabs that remain exposed.

In FIG. 9*c*, a battery cell structure 930 is formed of a common anode battery cell structure 905 of FIG. 9*b*, where a current-limiting devices 945*a* and 945*b* are connected to the cathodes of the two types of battery cells. The current-limiting devices 945*a* and 945 are connected to the output terminal. This structure enables a parallel battery structure 935 where two of the battery cell structures 930*a* and 930*b* are connected in parallel to common terminals. This merged battery cell structure 935 is most easily used in parallel applications. For example, the battery cells structure 935 is most applicable to tablet and smart phone applications, where no series connection is needed.

Figures 10A, 10B:
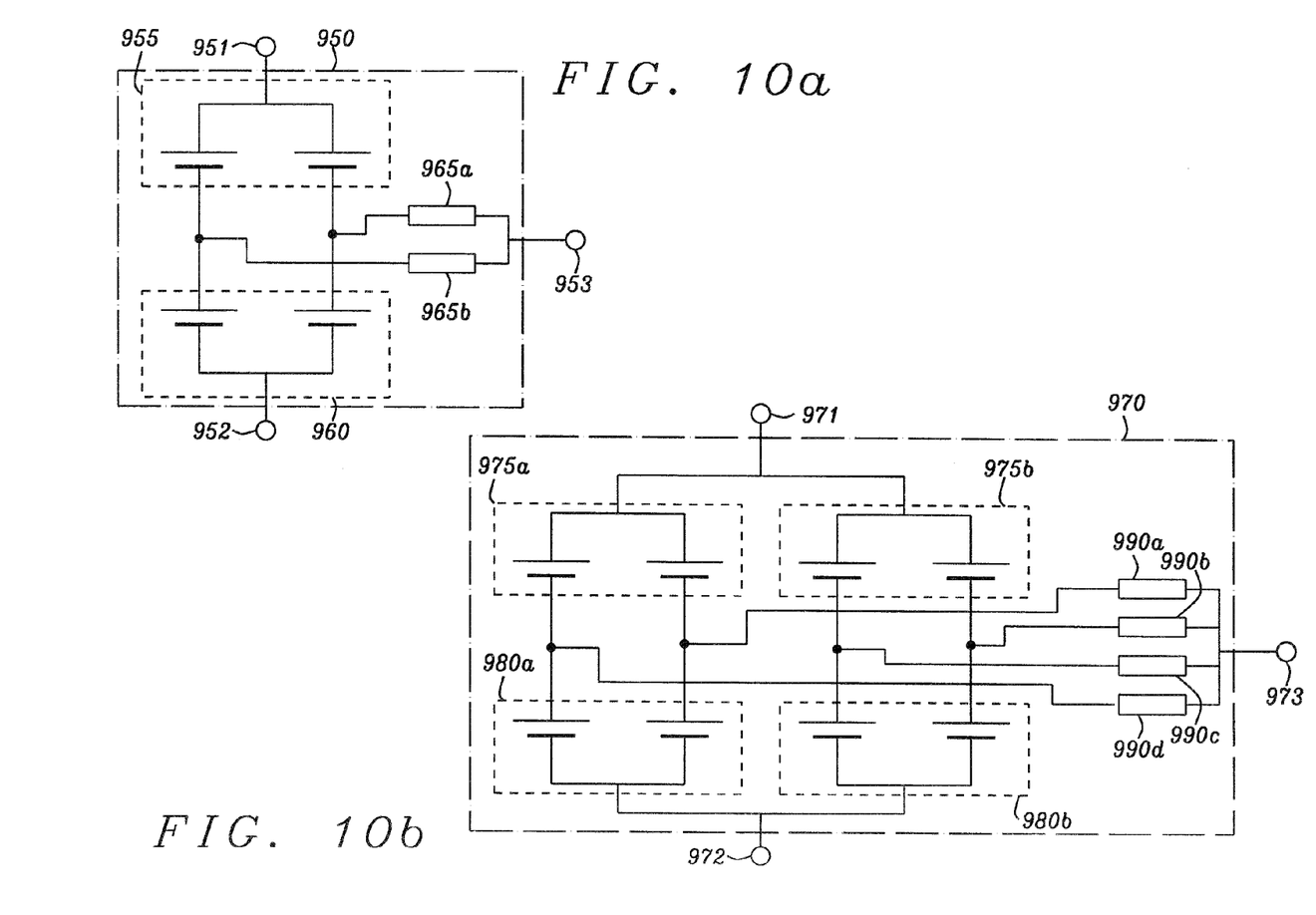
FIGS. 10a-10b are schematics of embodiments of hard serial and soft parallel structures of a multiple cell battery with interleaved electrodes embodying the principles of this disclosure.

FIGS. 10*a*-10*b* are schematics of embodiments of hard serial and soft parallel structures 950 and 970 of a multiple cell battery with interleaved electrodes. In FIG. 10*a*, the multiple cells battery has hard serial and soft parallel structure 950 that is formed of the common cathode merged cells battery structure 955 connected in series with the common anode merged cell battery structure 960. The common cathodes of the battery structure 955 are connected to the terminal 951. The common anodes of the battery structure 960 are connected to the terminal 952. Each of the two anodes of the battery structure 955 is connected to one of the two cathodes of the battery structure 960. One of the anode-cathode connections is connected to the current-limiting device 965*a* and the other the anode-cathode connections are connected to the current-limiting device 965*b*.

In FIG. 9*b*, two of the hard serial and soft parallel structures 950 are combined to form the hard serial and soft parallel structure 970. In this case, the battery structure is formed of two common cathode merged battery structures 975*a* and 975*b* each connected in series with two common anode merged battery structures 980*a* and 980*b*. The common cathodes of the battery structure 975*a* and 975*b* are connected to the terminal 971. The common anodes of the battery structures 980*a* and 980*b* are connected to the terminal 972. Each of the four anodes of the battery structures 975*a* and 975*b* is connected to one of the four cathodes of the battery structures 980*a* and 980*b*. One of the anode-cathode connections is connected to each of the current-limiting devices 990*a*, 990*b*, 990*c*, and 990*d*. Each of the merged battery structures as described above employ the merged cells structure as described above where multiple battery cell types are interleaved with a common battery cell type to form the merged battery structures as shown.

While the embodiments shown illustrate a lithium ion battery structure, other charge accumulation devices such as capacitors and other battery cell types may have multiple battery cell types and common electrodes interleaved to prevent large short circuit current and provide thermal dissipation to prevent thermal runaway. The other charge accumulators embody the principles of the present disclosure.

While this disclosure has been particularly shown and described with reference to the preferred embodiments thereof, it will be understood by those skilled in the art that various changes in form and details may be made without departing from the spirit and scope of the disclosure.

What is claimed is:

1. A method for forming a battery having multiple merged battery cells structured to prevent thermal runaway by cooling a shorted region between electrodes comprises the steps of:
   forming a plurality of electrodes of a first polarity for each of the multiple battery cells;
   forming a connection tab placed at a unique location on each of the plurality of electrodes for each battery cell of the multiple battery cells;
   forming a plurality of common electrodes of a second polarity;
   forming a connection tab on each common electrode at another location unique from the connection tabs of each of the multiple battery cells; and
   interleaving electrodes of the multiple battery cells and the multiple common electrodes to form a merged stack of the multiple battery cells such that when any of the electrodes of the multiple battery cells and the adjacent common electrodes short together, the current within the shorted battery cells is sufficiently small to prevent thermal runaway and the electrodes of the adjacent cells of the other battery cells of the first polarity and the common electrodes of the second polarity not having short circuits provide heat sinking for the heat generated by the short circuit to further prevent thermal runaway.

2. The method for forming a battery method for forming a battery claim 1 wherein the step of forming the electrodes of each battery cell of the multiple battery cells and the step of forming the common electrodes comprises the steps of:
   forming a first metal film to the shape of the each of the electrodes of the each battery cell of the multiple battery cells;
   forming a second metal film to the shape of the common electrodes;
   placing the first metal films of each of the electrodes of the each battery cells of the multiple battery cells in proximity with a first separator;
   placing the second metal films of each of the common electrodes in proximity with a second separator;
   coating the first metal film on both sides with a first electrochemically active material; and coating the second metal film on both sides with a second electrochemically active material.

3. The method for forming a battery claim 2 wherein the first metal film is aluminum.

4. The method for forming a battery of claim 2 wherein the second metal film is copper.

5. The method for forming a battery of claim 2 wherein the first electrochemically active material is graphite.

6. The method for forming a battery of claim 2 wherein the second electrochemically active material is lithium metal oxide.

7. The method for forming a battery of claim 2 wherein the electrodes of a first polarity for each of the multiple battery cells placed at the exterior surface have the electrochemically active material placed on one side of the first metal film placed toward the interior of the battery.

8. The method for forming a battery of claim 2 wherein the common electrodes placed at the exterior surface have the electrochemically active material placed on one side of the second metal film placed toward the interior of the battery.

9. The method for forming a battery of claim 1 further comprising the step assembling the battery by the steps of:
   interleaving each of the plurality of the electrodes of each of the plurality of battery cells of the first polarity;
   interleaving one of the plurality of common electrodes between each of the interleaved plurality of the electrodes of the each of the plurality of battery cells of the first polarity;
   placing a first half electrode having an active electrode material coating the first half electrode at a first side of the interleaved electrodes with the active electrode material adjacent to one of the interleaved electrodes;
   placing a second half electrode having the active electrode material coating the second half electrode at a second side of the interleaved electrodes with the active electrode material adjacent to another of the interleaved electrodes;
   compressing the interleaved electrodes of the first polarity of each cell of the multiple battery cells and the common electrodes;
   placing the interleaved electrodes of the first polarity of each cell of the multiple battery cells and the common electrodes in a shell or pouch;
   placing an electrolyte in the shell or pouch to immerse the interleaved electrodes of the first polarity of each battery cell of the plurality of battery cells and the common electrodes;
   sealing the shell or pouch;
   connecting with the connective tabs for each electrode of the first polarity of each of the plurality of battery cells to one of a plurality of terminals; and
   connecting the connective tabs for the common electrodes to a common terminal.

10. The method for forming a battery of claim 1 wherein the electrodes of the first polarity of each of the plurality of battery cells have a differing chemistry between the battery cells.

11. The method for forming a battery of claim 1 further comprising the step of connecting the interleaved plurality of battery cells in a series configuration.

12. The method of for forming a battery of claim 1 further comprising the step of connecting the interleaved plurality of battery cells in a parallel configuration.

13. The method for forming a battery of claim 1 further comprising the step of connecting the merged battery cells in a series-parallel configuration.

14. The method for forming a battery of claim 1 further comprising the step of protecting interleaved plurality of battery cells with a current limiting device.

15. The method for forming a battery claim 14 wherein the current limiting device is a fuse, a thermal cut-off device, a positive thermal coefficient device, a metal-oxide-semiconductor field effect transistor (MOSFET), or other apparatus capable of restricting the excess current flow through the interleaved electrodes of the first polarity of each battery cell of the plurality of battery cells and the common electrodes in an over-current event.

* * * * *